US012774934B2

(12) United States Patent
Tanaami et al.

(10) Patent No.: US 12,774,934 B2
(45) Date of Patent: Oct. 27, 2026

(54) CALIBRATION SYSTEM AND METHOD FOR A FORCE SENSOR BASED ON LOAD

(71) Applicant: SINTOKOGIO, LTD., Nagoya (JP)

(72) Inventors: Yoshikane Tanaami, Nagoya (JP); Atsushi Osawa, Nagoya (JP); Takumi Kobayashi, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 243 days.

(21) Appl. No.: 18/697,522

(22) PCT Filed: Dec. 10, 2021

(86) PCT No.: PCT/JP2021/045596
§ 371 (c)(1),
(2) Date: Apr. 1, 2024

(87) PCT Pub. No.: WO2023/058253
PCT Pub. Date: Apr. 13, 2023

(65) Prior Publication Data

US 2024/0410776 A1 Dec. 12, 2024

(30) Foreign Application Priority Data

Oct. 7, 2021 (JP) ................................ 2021-165548

(51) Int. Cl.
*G01L 25/00* (2006.01)
*G01L 1/22* (2006.01)

(52) U.S. Cl.
CPC ................ *G01L 25/00* (2013.01); *G01L 1/22* (2013.01)

(58) Field of Classification Search
CPC ......... G01L 1/142; G01L 1/22; G01L 1/2206; G01L 25/00; G01L 25/003; G01L 25/006;
(Continued)

(56) References Cited

U.S. PATENT DOCUMENTS

2016/0273990 A1 9/2016 Larsen et al.

FOREIGN PATENT DOCUMENTS

CN 101451933 A 6/2009
JP S63-109344 A 5/1988
(Continued)

OTHER PUBLICATIONS

Bilz et al, Analysis of the Measuring Uncertainty of a Calibration Setup for a 6-DOF Force/Torque Sensor, 2017 IEEE Sensors (Year: 2017).*

(Continued)

*Primary Examiner* — David L Singer
(74) *Attorney, Agent, or Firm* — Faegre Drinker Biddle & Reath LLP

(57) ABSTRACT

A calibration system includes a stage, a weighting jig, a parallel link mechanism, and a control apparatus. A weighted body includes a force sensor configured to output a value based on a load value including at least a component in one axial direction among components in six axial directions of a load applied to the weighted body, and a master sensor calibrated to output the load value according to the load. The parallel link mechanism includes output parts corresponding to the six rods, respectively. The six rods are connected in parallel to the weighting jig. The control apparatus is configured to control an output of each of the output parts, relatively displace the weighting jig with respect to the stage, and calibrate the force sensor on the basis of the value output from the force sensor and the load value output from the master sensor.

2 Claims, 6 Drawing Sheets

(58) Field of Classification Search
CPC ..... G01L 27/00; G01L 27/005; G01L 27/007; G01L 27/02; G01L 5/0066; G01L 5/16; G01L 5/1627
See application file for complete search history.

(56) References Cited

FOREIGN PATENT DOCUMENTS

| | | | | | |
|---|---|---|---|---|---|
| JP | 2011-112414 A | | 6/2011 | | |
| KR | 10-0679138 B1 | | 2/2007 | | |
| KR | 10-2017-0036153 A | | 4/2017 | | |
| KR | 20170036153 A | * | 4/2017 | ............. | G01L 25/00 |
| KR | 10-2017-0099020 A | | 8/2017 | | |

OTHER PUBLICATIONS

International Preliminary Report on Patentability mailed Apr. 18, 2024 for PCT/JP2021/045596.

Office action received for Korean patent application No. 10-2024-7004487 mailed on Jul. 2, 2026, 12 pages (6 pages English Translation and 6 pages Original document).

* cited by examiner

CALIBRATION SYSTEM AND METHOD FOR A FORCE SENSOR BASED ON LOAD

TECHNICAL FIELD

The present disclosure relates to a calibration system and a calibration method.

BACKGROUND ART

Patent Document 1 discloses a calibration apparatus that applies a load in six axial directions to a weighted body. This calibration apparatus includes a stage on which a weighted body is placed, a drive part that controls a position and a posture of the weighted body through the stage, and a weighting part that applies a weight to the weighted body. The weighting part includes a jig attached to an upper portion of the weighted body, a wire pulled out from the jig in a horizontal direction, a pulley for converting the wire from the horizontal direction to a vertical direction, and a weight attached to a distal end of the wire. The weight applied to the weighted body by the weighting part changes in six axial directions according to changes in the position and posture of the weighted body.

CITATION LIST

Patent Document

Patent Document 1: Japanese Unexamined Patent Publication No. 2011-112414

SUMMARY OF INVENTION

Technical Problem

The calibration apparatus disclosed in Patent Document 1 converts gravity applied to the weight into the load in six axial directions applied to the weighted body by the wire and the pulley. Thus, it is necessary to change the apparatus configuration such as the number or type of weights according to the magnitude of the load applied to the weighted body. Furthermore, in the apparatus disclosed in Patent Document 1, sliding resistance is generated between the wire and the pulley, and an error may occur in the load applied to the weighted body. The present disclosure provides a calibration system and a calibration method capable of performing calibration more easily and accurately.

Solution to Problem

According to one aspect of the present invention, there is provided a calibration system including a stage, a weighting jig, a parallel link mechanism, and a control apparatus. A weighted body is fixed to the stage. The weighted body includes a force sensor configured to output a value based on a load value including at least a component in one axial direction among components in six axial directions of a load applied to the weighted body, and a master sensor calibrated to output the load value according to the load. The weighting jig holds the weighted body between the stage and the weighting jig, and be fixed the weighted body. The parallel link mechanism includes six rods. The parallel link mechanism includes output parts corresponding to the six rods, respectively. The six rods are connected in parallel to the weighting jig. The control apparatus controls an output of each of the output parts, relatively displaces the weighting jig with respect to the stage, and calibrates the force sensor on the basis of the value output from the force sensor and the load value output from the master sensor.

In this calibration system, the weighted body is fixed to and held between the stage and the weighting jig. The six rods constituting the parallel link mechanism are connected in parallel to the weighting jig. The six rods are driven by respective output parts corresponding to the respective rods. The output of each of the output parts is controlled by the control apparatus to relatively displace the weighting jig with respect to the stage. Thus, a load in six axial directions can be applied to the weighted body. Then, a value based on a load value including at least a component in one axial direction among components in the six axial directions of a load applied to the weighted body is output from the force sensor, and a load value corresponding to the load is output from the calibrated master sensor. The control apparatus calibrates the force sensor on the basis of the value output from the force sensor and the load value output from the master sensor. As described above, the calibration system does not need to change the apparatus configuration such as the number or type of weights according to the magnitude of the load applied to the weighted body, and thus can perform calibration more easily. Further, in this calibration system, it is not necessary to consider the sliding resistance generated between the wire and the pulley, so that calibration can be performed more accurately.

According to another aspect of the present invention, a calibration method is provided. A calibration method includes fixing a weighted body to a stage, sandwiching the weighted body between the stage and a weighting jig and fixing the held weighted body to the weighting jig, controlling an output of each of output parts corresponding to six rods constituting a parallel link mechanism connected to the weighting jig and relatively displacing the weighting jig with respect to the stage, outputting, by a force sensor included in the weighted body, a value based on a load value including at least a component in one axial direction among components in six axial directions of a load applied to the weighted body, outputting, by a calibrated master sensor included in the weighted body, the load value according to the load, and calibrating the force sensor on the basis of the value output from the force sensor and the load value output from the master sensor.

With this calibration method, similarly to the above-described calibration system, more simple and accurate calibration can be performed.

Advantageous Effects of Invention

According to the present disclosure, it is possible to provide a calibration system and a calibration method capable of performing calibration more easily and accurately.

DESCRIPTION OF EMBODIMENTS

Figure 1:
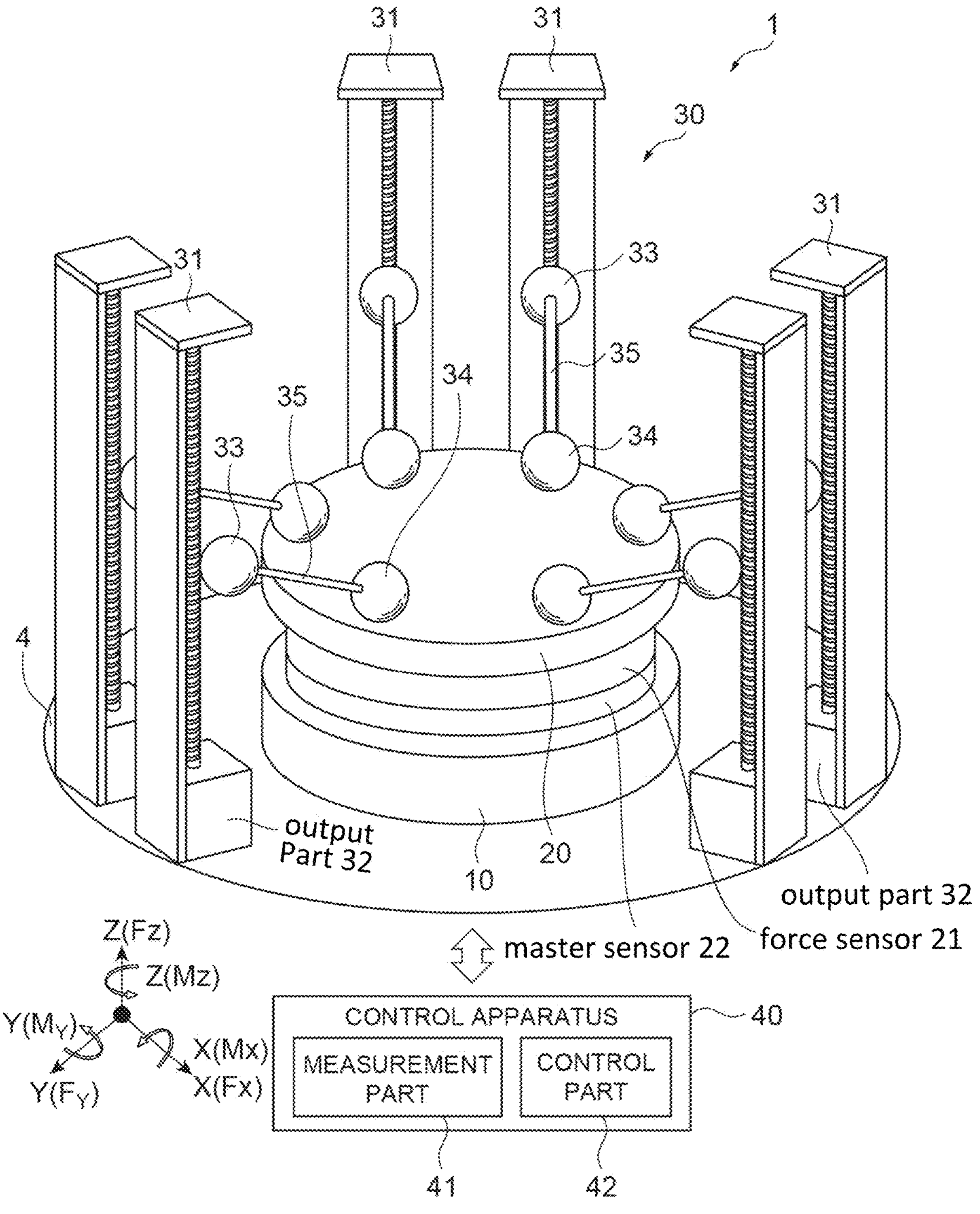
FIG. 1 is a configuration view of a calibration system according to an embodiment.

Hereinafter, embodiments of the present disclosure will be described with reference to the drawings. Note that, in the following description, the same or equivalent elements are denoted by the same reference numerals, and redundant description will not be repeated. The dimensional ratios in the drawings do not necessarily coincide with those in the description. The words "upper", "lower", "left", and "right" are based on the illustrated state and are used for convenience.

[Calibration System]

FIG. 1 is a configuration diagram of a calibration system according to an embodiment. As illustrated in FIG. 1, a calibration system 1 is an apparatus that calibrates a force sensor 21 by applying a load to a weighted body 2 including the force sensor 21 and a master sensor 22. The load is applied to the weighted body 2 by the calibration system 1. The force sensor 21 is a sensor that outputs a value corresponding to an applied load value. The master sensor 22 is a force sensor calibrated to output a load value corresponding to the load. Details of the force sensor 21 and the master sensor 22 will be described later. Hereinafter, a test for calibrating the force sensor 21 so as to function as a sensor that outputs a load value will be described.

The calibration system 1 includes a base 4, a stage 10, a weighting jig 20, a parallel link mechanism 30, and a control apparatus 40. The control apparatus 40 includes a measurement part 41 and a control part 42.

The stage 10 is a pedestal provided on the base 4. The stage 10 is formed of metal as an example. The stage 10 may be formed integrally with the base 4. The weighted body 2 is fixed to the stage 10. In the example illustrated in FIG. 1, the weighted body 2 is fixed so that the master sensor 22 side faces an upper surface of the stage 10.

The weighted body 2 and the stage 10 are fixed by screwing, for example. As a more specific example, a female screw is provided on the upper surface of the stage 10. A bolt is inserted into a through hole provided in the master sensor 22, and the master sensor 22 is screwed to the stage 10. As an example, the force sensor 21 is connected to the master sensor 22 through a jig or the like. The force sensor 21 may be directly connected to the master sensor 22. Since the force sensor 21 and the master sensor 22 are connected, a load equal to the load applied to the force sensor 21 is applied to the master sensor 22. should be note that the method for fixing the stage 10 and the master sensor 22 is not limited to screwing. When the stage 10 and the base 4 are integrally formed, the stage 10 may be the same as the base 4. That is, the weighted body 2 may be fixed to the base 4.

The weighting jig 20 holds the weighted body 2 with the stage 10. The weighting jig 20 is, for example, a plate-like member having an upper surface and a lower surface. The weighting jig 20 is formed of metal as an example. The weighted body 2 is fixed to the lower surface of the weighting jig 20 and is held between the upper surface of the stage 10 and the lower surface of the weighting jig 20. As a more specific example, a female screw is provided on the upper surface of the force sensor 21. A bolt is inserted into a through hole provided in the weighting jig, and the force sensor 21 is screwed to the weighting jig 20. Should be note that the method of fixing the weighting jig 20 and the force sensor 21 is not limited to screwing.

The parallel link mechanism 30 includes six ball screw mechanisms 31 and rods 35 respectively connected to the ball screw mechanisms 31. As an example, the ball screw mechanisms 31 each include a ball screw, a linear guide, and the like connected to an output part 32 of a motor or the like. The six ball screw mechanisms 31 are disposed in an annular shape so as to surround the stage 10. An end of each of the six ball screw mechanisms 31 is fixed to the base 4. Thus, the relative positional relationship between the stage 10 and the parallel link mechanism 30 is fixed. The six ball screw mechanisms 31 are arranged as three sets of ball screw mechanisms 31 in which two ball screw mechanisms 31 arranged at equal intervals form one set. As an example, the three sets of ball screw mechanisms 31 are arranged so as to be point-symmetric about the stage 10 by 120 degrees.

The parallel link mechanism is roughly classified into three types of "telescopic", "rotary", and "linear". In the parallel link mechanism 30 of the present embodiment, as an example, a linear motion parallel link mechanism is configured by six ball screw mechanisms 31 and rods 35.

As an example, the linear motion parallel link mechanism includes the ball screw mechanism 31, the output part 32, a first bearing 33, and a second bearing 34 corresponding to each of the six rods 35. The output part 32 linearly moves the first bearing 33 along the Z direction in the ball screw mechanism 31. The first bearing 33 and the second bearing 34 are coupling members that couple the two members with three degrees of freedom in an X rotation direction, a Y rotation direction, and a Z rotation direction. The first bearing 33 is fixed to the ball screw mechanism 31. The second bearing 34 is fixed to the upper surface of the weighting jig 20. The rod 35 is a structural member that connects the first bearing 33 and the second bearing 34. In other words, the first bearing 33 is connected to an end of the rod 35, and the second bearing 34 is connected to a tip of the rod 35. The six rods 35 are connected in parallel to the upper surface of the weighting jig 20 through respective second bearings 34. The connection in parallel means that each of the rods 35 is connected to a predetermined position of the weighting jig 20. Further, the six rods 35 are connected to the respective ball screw mechanisms 31 through the first bearings 33.

The parallel link mechanism 30 may be a telescopic parallel link mechanism or a rotary parallel link mechanism. The telescopic parallel link mechanism as another example also includes output parts corresponding to the six rods, respectively. Each output part is incorporated into each rod and extends or contracts the rod itself to apply a load to the weighting jig to which each rod is connected. Then, the rotary parallel link mechanism also includes output parts corresponding to the six rods, respectively. Each output part is provided at an end of each rod. Each output part turns each rod to apply a load to the weighting jig to which each rod is connected. As described above, the parallel link mechanism 30 only needs to have a configuration in which each of the six rods is independently operated, and the output part may be externally attached to the rod or may be incorporated in the rod.

The parallel link mechanism 30 applies a load in at least one axial direction in the six axial directions to the weighted body 2 held between the stage 10 and the weighting jig 20. The six axial directions are three axial directions orthogonal to each other and three rotation directions in which respective axes of the three axes are rotation axes. In the following description, the three axial directions are referred to as an X direction, a Y direction, and a Z direction, respectively. In the present embodiment, the X direction is a first horizontal direction, the Y direction is a second horizontal direction perpendicular to the first horizontal direction, and the Z direction is a vertical direction. Further, three rotation directions about axes corresponding to the X direction, the Y direction, and the Z direction are referred to as an X rotation direction, a Y rotation direction, and a Z rotation direction, respectively.

Assuming that a load value including these components in the six axial directions is F, the load value F can be expressed by the following mathematical formula (1).

$$F=[Fx, Fy, Fz, Mx, My, Mz] \tag{1}$$

Here, Fx is a load of the X direction component, Fy is a load of the Y direction component, Fz is a load of the Z direction component, Mx is a load of the X rotation direction component, My is a load of the Y rotation direction component, and Mz is a load of the Z rotation direction component. The load value F does not need to include all the components in the six axial directions, and only needs to include at least a component in one or more axial directions.

As an example, the control apparatus 40 is configured as a programmable logic controller (PLC) having a function of a motor controller. The control apparatus 40 may include a computer system including a processor such as a central processing unit (CPU), a memory such as a random access memory (RAM) and a read only memory (ROM), an input/output device such as a touch panel, a mouse, a keyboard, and a display, and a communication device such as a network card. As illustrated in FIG. 1, the control apparatus 40 is integrated with the measurement part 41 and the control part 42. The control apparatus 40 implements the functions of the measurement part 41 and the control part 42 by operating each piece of hardware under the control of a processor based on a computer program stored in a memory. The control apparatus 40 may include an interface to which the force sensor 21, the master sensor 22, other sensors, and the like are connected.

Figure 2:
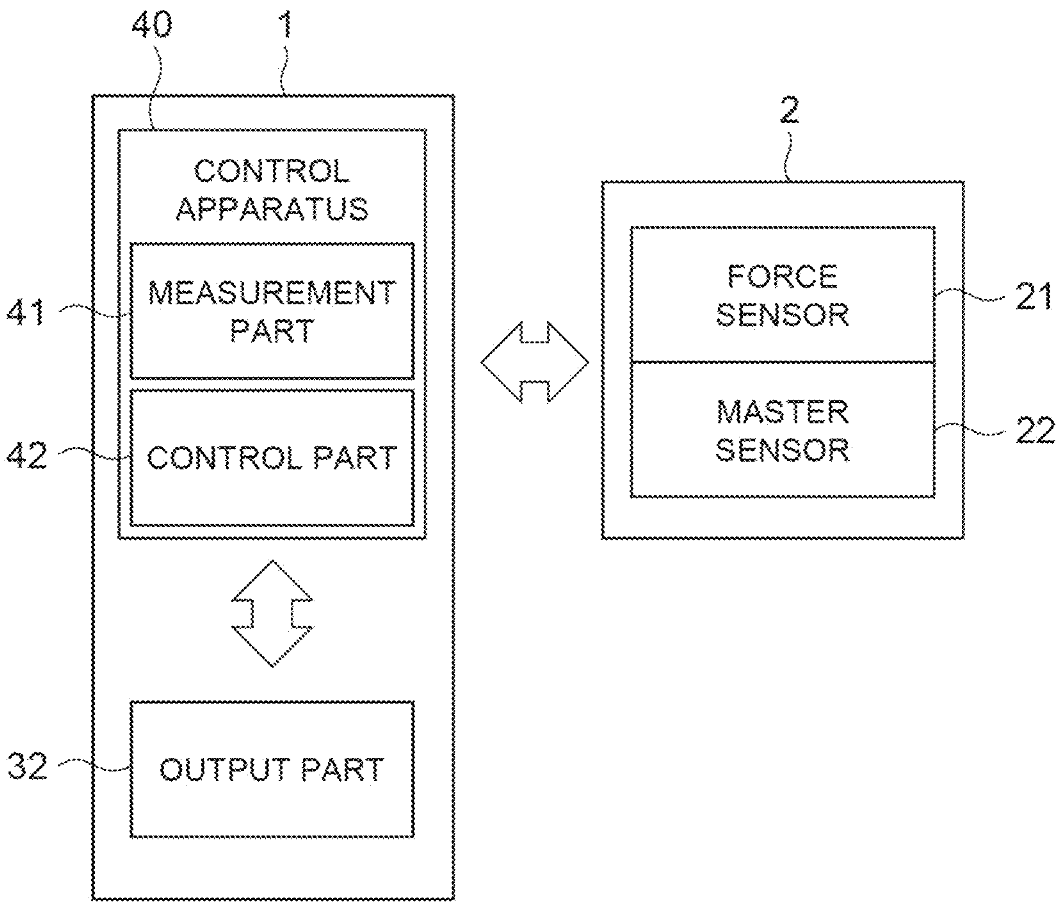
FIG. 2 is a block diagram for describing the calibration system according to the embodiment.

The measurement part 41 measures the load value on the basis of the current amount and the like. FIG. 2 is a block diagram for describing the calibration system 1 according to the embodiment. As illustrated in FIG. 2, the measurement part 41 is communicably connected to the control part 42. The measurement part 41 acquires a control value of each output part 32 controlled by the control part 42. The control value is, for example, a consumption current value. The measurement part 41 measures the load value applied to the weighted body 2 from the control value of the output part 32.

The control part 42 controls the output of each output part 32 so as to displace the weighting jig 20 relative to the stage 10. Specifically, when the output part 32 is a motor, the control part 42 controls a current or the like applied to the output part 32. The control part 42 may control the output of the output part 32 on the basis of the load value output from the master sensor 22. Further, the control part 42 may control the output of the output part 32 on the basis of the load value measured by the measurement part 41.

In the present embodiment, the control apparatus 40 has a function of determining abnormality in calibration on the basis of the load value output from the master sensor 22 and a function of calibrating the force sensor 21 on the basis of the load value output from the master sensor 22. Specifically, the control apparatus 40 compares the load value output from the master sensor 22 with the load value measured by the measurement part 41 to determine abnormality in calibration. Further, the control apparatus 40 calibrates the force sensor 21 on the basis of the load value output from the master sensor 22.

[Master Sensor and Force Sensor]

In the present embodiment, as an example, a strain gauge type force sensor 21 is used. The strain gauge type force sensor 21 measures the magnitude of force applied to the force sensor 21 using a strain gauge provided in a structural member of the force sensor 21. Specifically, the load applied to the force sensor 21 is measured by converting the amount of elastic deformation generated in the structural member of the force sensor 21 by a resistance change of the strain gauge. The load value applied to the force sensor 21 is output as a value. In other words, the load value of the load applied to the force sensor 21 is converted into a value. The value is, for example, an electrical signal such as a voltage.

In the present embodiment, a calibrated strain gauge type force sensor is used as an example of the master sensor 22. The master sensor 22 may not be a sensor of the same type as the force sensor 21. The master sensor 22 only needs to output the calibrated load value. For example, the force sensor 21 and the master sensor 22 may be piezoelectric element type or electrostatic capacitance type force sensors. The force sensor 21 and the master sensor 22 may be any force sensor as long as the force sensor outputs at least a component in one axial direction among the components in the six axial directions of the applied load. The load applied to the master sensor 22 is output as the load value including the components in the six axial directions. Should be note that the master sensor 22 may output a value before being converted into the load value. In this case, the value of the master sensor 22 is converted into a load value in the control apparatus 40.

In the present embodiment, the weighted body 2 includes the force sensor 21 and the master sensor 22, and the master sensor 22 is fixed to the force sensor 21. Therefore, the same load as the load applied to the force sensor 21 is applied to the master sensor 22. The load value of the master sensor 22 and the value of the force sensor 21 are based on the same load.

[Calibration Method Using Calibration System]

Figure 3:
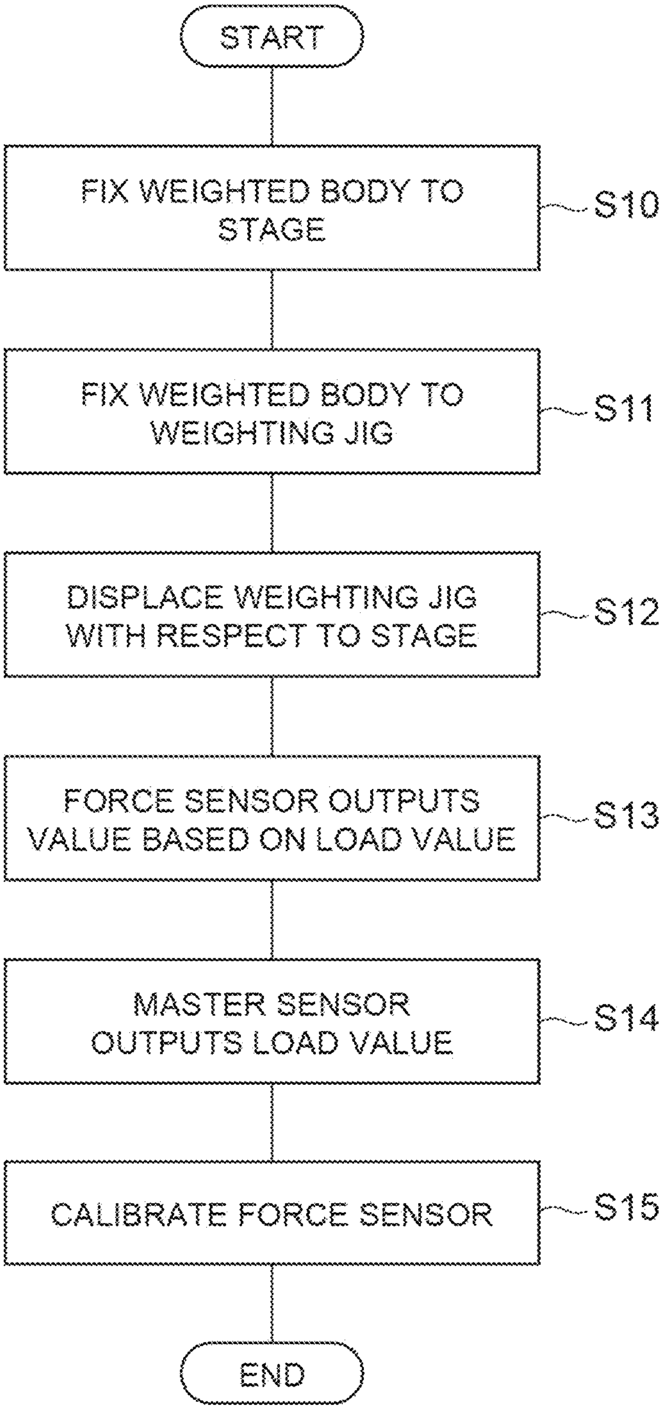
FIG. 3 is a flowchart illustrating an example of a calibration method using the calibration system.

FIG. 3 is a flowchart illustrating a calibration method using the calibration system 1. The flowchart illustrated in FIG. 3 is started by an operator or the like as an example. First, a process (step S10) of fixing the weighted body 2 to the stage 10 is performed.

In the present embodiment, the master sensor 22 side of the weighted body 2 is fixed so as face the upper surface of the stage 10. As an example, the force sensor 21 is connected to the master sensor 22 through a jig or the like.

Next, a process (step S11) of fixing the weighted body 2 to the weighting jig 20 is performed. As an example, the force sensor 21 side is fixed so as to face the lower surface of the weighting jig 20. The weighted body 2 is held between the upper surface of the stage 10 and the lower surface of the weighting jig 20.

Next, a process (step S12) of controlling outputs of the output parts 32 corresponding to the six rods 35 to relatively displace the weighting jig 20 with respect to the stage 10 is performed. In step S13, the outputs of the output parts 32 may be controlled on the basis of the master sensor 22. Specifically, the control apparatus 40 controls the outputs of the output parts 32 so that the load value output from the master sensor 22 approaches a target value. The weighted body 2 is fixed to the upper surface of the stage 10, and is further fixed to the lower surface of the weighting jig 20. Thus, a load value is applied to the weighted body 2 according to the relative displacement between the stage 10 and the weighting jig 20. In other words, the output of each output part 32 causes elastic deformation of the weighted body 2. The weighting jig 20 is displaced with respect to the stage 10 according to the amount of elastic deformation of the weighted body 2. In the present embodiment, the base 4, the stage 10, the weighting jig 20, and the parallel link mechanism 30 have greater rigidity than the rigidity of the weighted body 2. Therefore, the relative displacement amount of the weighting jig 20 with respect to the stage 10 approximates the elastic deformation amount of the weighted body 2.

Next, a process (step S13) in which the force sensor 21 included in the weighted body 2 outputs a value based on a load value including at least a component in one axial direction among the components in the six axial directions of a load applied to the weighted body 2 and a process (step S14) in which the calibrated master sensor 22 included in the weighted body 2 outputs a load value according to the load applied to the weighted body 2 are performed. The order of step S13 and step S14 may be changed.

Finally, a process (step S15) of calibrating the force sensor 21 is performed. The calibration of the force sensor 21 is to calculate a calibration matrix C of the force sensor 21 on the basis of a value $V_S$ output from the force sensor 21 and a load value $F_M$ of the master sensor 22. The value $V_S$ output from the force sensor 21 may be referred to as $V_S$ in the following description. The load value $F_M$ of the master sensor 22 may be referred to as $F_M$ in the following description. The calibration matrix C of the force sensor 21 may be referred to as C in the following description. Specifically, the calibration matrix C is calculated on the basis of the value $V_S$ output from the force sensor 21 and the load value $F_M$ of the master sensor 22 when the load value output from the master sensor 22 reaches the predetermined range included in the target value described above. Details of C will be described later. $V_S$ acquired in step S15 is expressed by the following mathematical formula (2). Further, $F_M$ acquired in step S15 is expressed by the following mathematical formula (3).

$$V_S = [V_{S1}, V_{S2}, V_{S3}, V_{S4}, V_{S5}, V_{S6}] \tag{2}$$

$$F_M = [F_{M1}, F_{M2}, F_{M3}, F_{M4}, F_{M5}, F_{M6}] \tag{3}$$

$V_S$ and $F_M$ are outputs based on the same load. Thus, by multiplying $V_S$ by a predetermined matrix, the relationship between $V_S$ and $F_M$ can be expressed by an equation. That is, $F_M$ is expressed as a product of C and $V_S$ as expressed in the following mathematical formula (4). In other words, C is a calibration matrix for converting $V_S$ into $F_M$. C is determined for each individual of the force sensor 21.

$$F_M = C \times V_S \tag{4}$$

The control apparatus 40 calculates C. C is calculated by multiplying $F_M$ by an inverse matrix $V_S^{-1}$ of $V_S$ as illustrated in the following mathematical formula (5). Specifically, the force sensor 21 and the master sensor 22 are connected to an interface of the control apparatus 40. The control apparatus 40 calculates $V_S^{-1}$ from the acquired $V_S$. The control apparatus 40 calculates C by multiplying the acquired $F_M$ by $V_S^{-1}$.

$$F_M \times V_S^{-1} = C \tag{5}$$

The control apparatus 40 calculates C on the basis of the above mathematical formulas (2), (3), (4), and (5). C is an example of a calibration matrix of the force sensor 21. C is written in an internal memory of the force sensor 21, for example. In addition, when the force sensor 21 does not have an internal memory, C may be written in an external memory provided outside the force sensor 21. The value $V_S$ output from the force sensor 21 is converted on the basis of C stored in the internal memory or the external memory and output. Thus, the flowchart illustrated in FIG. 3 ends.

The control apparatus 40 determines abnormality in calibration on the basis of the load value measured by the master sensor 22. Specifically, as an operation of determining abnormality in calibration, a process (step S20) of acquiring the load value measured by the measurement part 41, a process (step S21) of determining abnormality in calibration on the basis of the load value output from the master sensor 22 and the load value measured by the measurement part 41, and a process (step S22) of canceling the calibration are performed.

The operation of determining abnormality in calibration is started, for example, in the process (step S11) of fixing the weighted body 2 to the weighting jig 20. The operation of determining abnormality in calibration is executed simultaneously in parallel with the flowchart illustrated in FIG. 3, and the operation of determining abnormality in calibration is preferentially executed.

First, the process (step S20) of acquiring the load applied to the weighted body 2 is performed. The control apparatus 40 measures load values of loads applied to the force sensor 21 and the master sensor 22. In the present embodiment, the measurement part 41 measures the load value on the basis of the control value of each output part 32 controlled by the control part 42. The control value is, for example, a consumption current value.

For example, the measurement part 41 stores in advance a correspondence table in which the control value and the load value of each output part 32 are associated with each other. The correspondence table is created when normal calibration is performed. The measurement part 41 refers to the correspondence table and measures the load value on the basis of the current control value of each output part 32. Further, the measurement part 41 may measure the load value on the basis of a force conversion matrix that converts an output value of each output part 32 into a load value. The force conversion matrix is calculated on the basis of the control value of the output part 32 and the load value of the master sensor 22.

Next, a process (step S21) of determining abnormality in calibration on the basis of the load value output from the master sensor 22 and the load value measured by the measurement part 41 is performed. The control apparatus 40 compares the load value output from the master sensor 22 with the load value measured by the measurement part 41. The load value output from the master sensor 22 may be referred to as a first load value in the following description. The load value measured by the measurement part 41 may be referred to as a second load value in the following description.

When it is determined that the relationship between the first load value and the second load value deviates from a predetermined relationship by the comparison, the control apparatus 40 determines that the calibration is abnormal.

The predetermined relationship refers to, for example, a relationship in which the second load value is included in a predetermined numerical range based on the first load value. When the second load value is not included in the predetermined numerical range based on the first load value, it is determined that the first load value and the second load value deviate from the predetermined relationship.

When the control apparatus 40 has not determined that the calibration is abnormal (step S21: NO), the operation of determining abnormality in calibration ends. In this case, the operation of determining abnormality in calibration is restarted, and is repeatedly executed from step S20. When the control apparatus 40 determines that the calibration is abnormal (step S21: YES), a process (step S22) of canceling the calibration is performed. In step S22, as an example, the output to the output part 32 is stopped, and the operator or the like is notified that the calibration is abnormal. At the following timing, the operation of the flowchart of FIG. 3 becomes invalid. Thus, the operation of determining abnormality in calibration ends.

SUMMARY OF EMBODIMENTS

In the calibration system 1 and the calibration method, the weighted body 2 is fixed to and held between the stage 10 and the weighting jig 20. The six rods 35 constituting the parallel link mechanism 30 are connected in parallel to the weighting jig 20. The six rods 35 are driven by the respective output parts 32 corresponding to the respective rods 35. The output of each of the output parts 32 is controlled by the control apparatus 40 to relatively displace the weighting jig 20 with respect to the stage 10. Thus, the load in the six axial directions can be applied to the weighted body 2. Then, a value based on a load value including at least a component in one axial direction among the components in the six axial directions of a load applied to the weighted body 2 is output from the force sensor 21, and a load value corresponding to the load is output from the calibrated master sensor 22. The control apparatus 40 calibrates the force sensor 21 on the basis of the value output from the force sensor 21 and the load value output from the master sensor 22. As described above, the calibration system 1 does not need to change the apparatus configuration such as the number or type of weights according to the magnitude of the load applied to the weighted body 2, and thus the calibration can be performed more easily. Further, in the calibration system 1, it is not necessary to consider the sliding resistance generated between the wire and the pulley, so that calibration can be performed more accurately.

The control apparatus may determine abnormality in calibration on the basis of the load value output from the master sensor 22. With the calibration system 1 and the calibration method, abnormality in calibration can be determined on the basis of the load value output from the master sensor 22.

The calibration system 1 can be downsized as compared with a calibration apparatus using a weight. By replacing the output part 32, the range of the load can be easily changed as compared with a calibration apparatus using a weight. By replacing the master sensor 22, the range of calibration can be easily changed as compared with a calibration system using a weight. Since there is no limitation on the posture at the time of calibration, apparatus design is facilitated. Since the posture does not change at the time of calibration, an error due to a variation in the barycentric position is suppressed.

Although various exemplary embodiments have been described above, various omissions, substitutions, and changes may be made without being limited to the above embodiments. Hereinafter, differences from the above embodiment will be mainly described, and common description will be omitted.

First Modification

Figure 4:
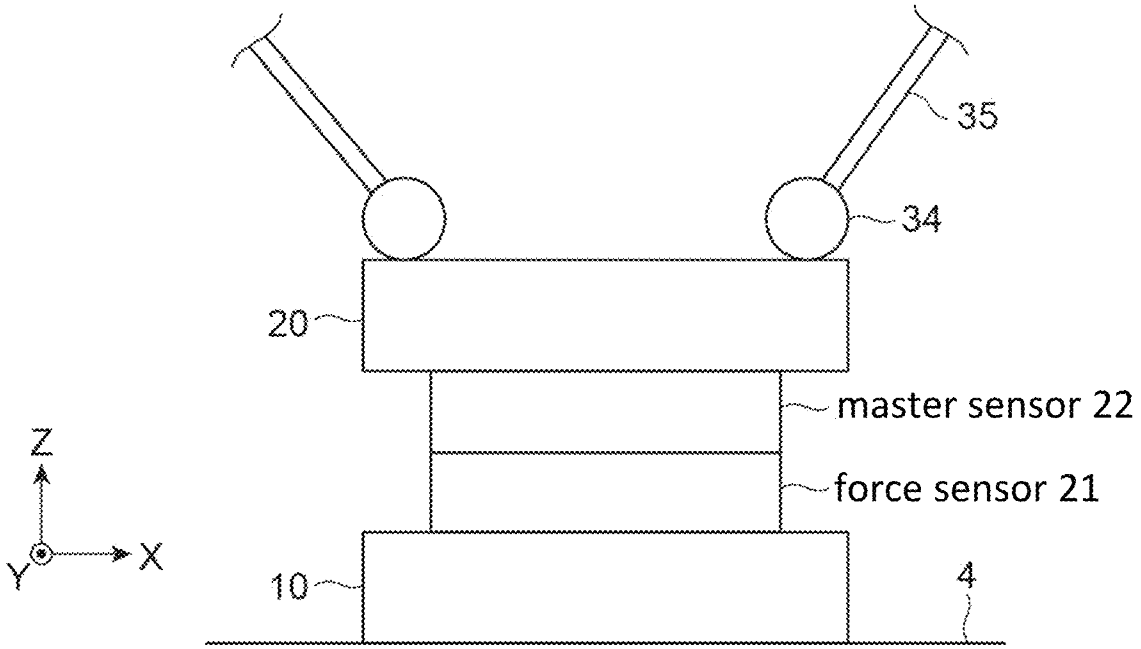
FIG. 4 is a side view for describing a calibration system of a first modification.

FIG. 4 is a side view for describing a calibration system of a first modification. In the above embodiment, the weighted body 2 is fixed so that the master sensor 22 side faces the upper surface of the stage 10. In the first modification, as illustrated in FIG. 4, the force sensor 21 side is fixed so as to face the upper surface of the stage 10. The master sensor 22 side is fixed so as to face the lower surface of the weighting jig 20. As described above, the stacking order of the force sensor 21 and the master sensor 22 in the weighted body 2 is not limited, and the same function and effect are obtained in either stacking order.

Second Modification

Figure 5:
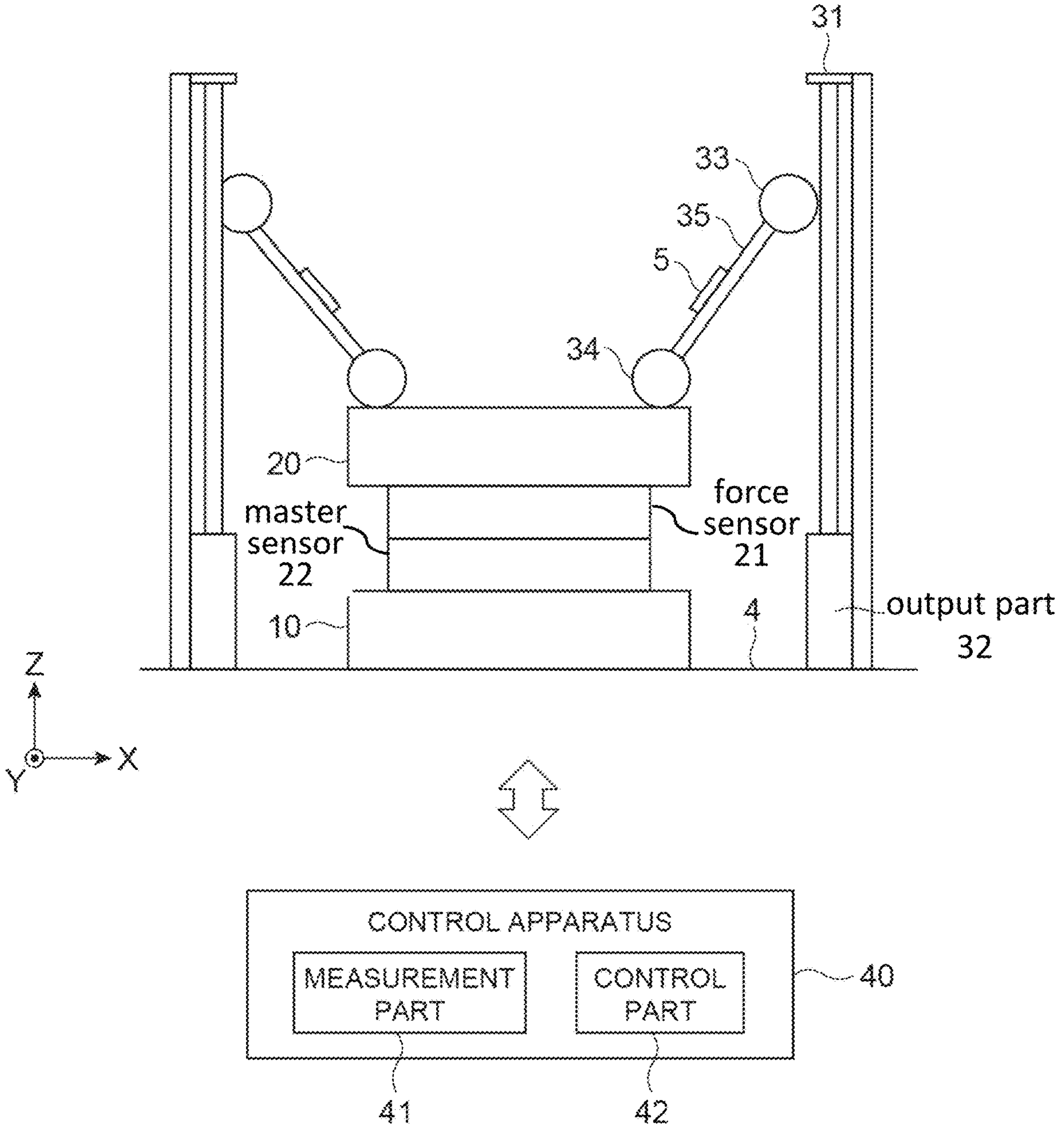
FIG. 5 is a side view for describing a calibration system of a second modification.

FIG. 5 is a side view for describing a calibration system of a second modification. In the above embodiment, abnormality in calibration is determined on the basis of the load value output from the master sensor 22 and the load value measured by the measurement part 41. The calibration system may determine abnormality in calibration on the basis of the master sensor 22 and other measurement means. In the second modification, as an example of another measuring means, as illustrated in FIG. 5, a strain gauge 5 is provided on each of the rods 35. The strain gauge 5 outputs strain of the rod 35. The control apparatus 40 determines abnormality in calibration on the basis of the load value output from the master sensor 22 and the output of the strain gauge 5.

Other measuring means may be load cells provided on the respective rods 35. As described above, in the calibration system 1, the calibration system 1 may determine abnormality in calibration on the basis of the master sensor 22 and other measurement means such as a strain gauge or a load cell.

Third Modification

Figure 6:
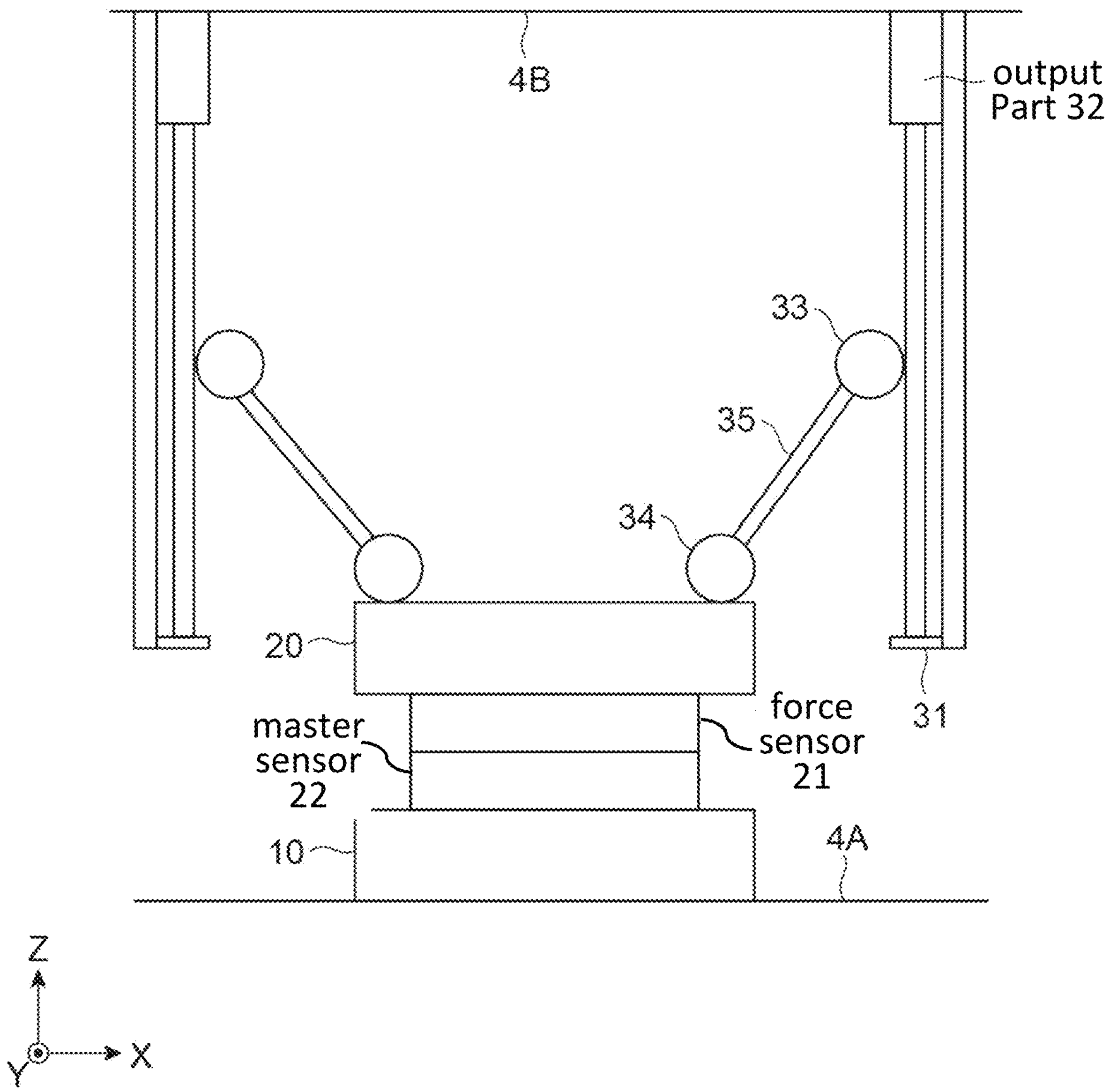
FIG. 6 is a side view for describing a calibration system of a third modification.

FIG. 6 is a side view for describing a calibration system of a third modification. In the above embodiment, the base 4 is one plate-shaped member. The base 4 may include a plurality of members. In the third modification, as illustrated in FIG. 6, the stage 10 is fixed to a base 4A, and six ball screw mechanisms 31 are fixed to a base 4B. The stage 10 may be fixed to the base 4B. The base 4A and the base 4B are two opposing plate-like members having a fixed relative positional relationship. As an example, the base 4A and the base 4B are connected by a support column (not illustrated), and a relative positional relationship is fixed. Further, in the present embodiment, the stage 10 and the ball screw mechanism 31 of the parallel link mechanism 30 are fixed on the same plane. The stage 10 and the ball screw mechanism 31 of the parallel link mechanism 30 may not be fixed on the same plane. As described above, in the fourth modification, the degree of freedom of the posture of the stage 10 and the six ball screw mechanisms 31 is improved.

REFERENCE SIGNS LIST

1 . . . Calibration system, 2 . . . Weighted body, 21 . . . Force sensor, 22 . . . Master sensor, 4, 4A, 4B . . . Base,

10 . . . Stage, 20 . . . Weighting jig, 30 . . . Parallel link mechanism, 31 . . . Ball screw mechanism, 32 . . . Output part, 35 . . . Rod, 40 . . . Control apparatus, 41 . . . Measurement part, 42 . . . Control part.

The invention claimed is:

1. A calibration system, comprising:
a stage configured to be fixed to a weighted body;
a weighting jig configured to hold the weighted body between the stage and the weighting jig, and configured to be fixed to the weighted body;
a parallel link mechanism including six rods, the parallel link mechanism including output parts corresponding to the six rods, respectively, the six rods being connected in parallel to the weighting jig; and
a control apparatus configured to control an output of each of the output parts and relatively displace the weighting jig with respect to the stage,
wherein
the weighted body includes
a force sensor configured to output a value based on a load value including at least a component in one axial direction among components in six axial directions of a load applied to the weighted body, and
a master sensor calibrated to output the load value according to the load, and
the control apparatus configured to calibrate the force sensor on a basis of the value output from the force sensor and the load value output from the master sensor.

2. A calibration method, comprising:
fixing a weighted body to a stage;
holding the weighted body between the stage and a weighting jig, and fixing the held weighted body to the weighting jig;
controlling an output of each of output parts of six rods constituting a parallel link mechanism connected to the weighting jig and relatively displacing the weighting jig with respect to the stage;
outputting, by a force sensor included in the weighted body, a value based on a load value including at least a component in one axial direction among components in six axial directions of a load applied to the weighted body;
outputting, by a calibrated master sensor included in the weighted body, the load value according to the load; and
calibrating the force sensor on a basis of the value output from the force sensor and the load value output from the master sensor.

* * * * *